United States Patent
Nakamura et al.

(10) Patent No.: US 6,699,381 B2
(45) Date of Patent: Mar. 2, 2004

(54) WATER PURIFICATION/STERILIZATION METHOD AND DEVICE THEREFOR

(75) Inventors: Shinichi Nakamura, Osaka (JP); Kunihiko Fukuzuka, Osaka (JP); Kenji Nagayoshi, Osaka (JP); Masaki Miyashita, Osaka (JP)

(73) Assignee: Omega Co., Ltd., Osaka (JP)

( * ) Notice: Subject to any disclaimer, the term of this patent is extended or adjusted under 35 U.S.C. 154(b) by 102 days.

(21) Appl. No.: 09/984,060

(22) Filed: Oct. 26, 2001

(65) Prior Publication Data

US 2002/0074243 A1 Jun. 20, 2002

(30) Foreign Application Priority Data

Oct. 27, 2000 (JP) ........................................ 2000-328779

(51) Int. Cl.$^7$ ................................................. C02F 1/461
(52) U.S. Cl. ...................... 205/701; 205/743; 205/751; 205/761; 204/267; 204/272; 204/274; 204/276
(58) Field of Search ................................ 205/701, 743, 205/751, 761, 759; 204/267, 272, 274, 276

(56) References Cited

U.S. PATENT DOCUMENTS

| | | | | |
|---|---|---|---|---|
| 5,108,563 A | * | 4/1992 | Cook | ........................ 205/760 |
| 6,527,922 B2 | * | 3/2003 | Nakamura et al. | .......... 204/272 |

FOREIGN PATENT DOCUMENTS

| | | |
|---|---|---|
| JP | 07-3241818 | 12/1912 |
| JP | 06-26968 | 10/1994 |
| JP | 7-256264 | 10/1995 |
| JP | 07-256264 | 10/1995 |
| JP | 07/284774 | 10/1995 |
| JP | 7-284774 | 10/1995 |
| JP | 11-090447 | 4/1996 |
| JP | 8-261565 | 10/1996 |
| JP | 8-267072 | 10/1996 |
| JP | 09-189141 | 7/1997 |
| JP | 09-225471 | 9/1997 |
| JP | 9-225471 | 9/1997 |
| JP | 10-202067 | 4/1998 |
| JP | 10-227524 | 8/1998 |
| JP | 10/227525 | 8/1998 |
| JP | 10-227525 | 8/1998 |
| JP | 11-056661 | 3/1999 |
| JP | 11-090447 | * 4/1999 |
| JP | 11-104644 | 4/1999 |
| JP | 11-114001 | 4/1999 |
| JP | 2000-042558 | 2/2000 |
| JP | 2000-070944 | 3/2000 |
| JP | 2000-093970 | 4/2000 |
| JP | 2000-117257 | 4/2000 |
| JP | 2000-185284 | 4/2000 |
| JP | 2000-185286 | 4/2000 |
| JP | 2000-185287 | 4/2000 |
| JP | 2000-157431 | 6/2000 |
| JP | 2000-157434 | 6/2000 |
| JP | 2000-157435 | 6/2000 |
| JP | 2000-157979 | 6/2000 |
| JP | 2000-185284 | 7/2000 |

* cited by examiner

*Primary Examiner*—Arun S. Phasge
(74) *Attorney, Agent, or Firm*—Rader, Fishman & Grauer PLLC

(57) ABSTRACT

It is a compact water purification/sterilization method and its device with a high electrolytic efficiency in which even though it is used continuously for a long period of time in order to purify and sterilize water with low electrical conductivity such as the water from a swimming pool, bathtub, pond, 24-hour bath, farming tank or AC, there is no deterioration or breakage of the electrodes or deformation of the plastic case for the electrolyzing device due to heat, and even if the electrical flow per electrode surface area is increased, it provides superior long-term endurance performance. Barrel-shaped (cylindrical-shaped) anodes and cathodes are arranged alternately in a concentric manner in layers at given inter-electrode intervals. The anode is a ferrite rod with a long hole along the center axis direction or a ferrite pipe, and in the hole, heating so that it has fluidity, or mercury, which is liquid at ordinary temperature, is filled, in advance, fills a low-melting point metal. Then, a conductive metal terminal body is inserted so that the contact area between the terminal and the ferrite electrode is sufficient, and, additionally, the conductivity at the contact portion is increased. This electrolyzing device is directly immersed in the water and electrolysis is carried out.

34 Claims, 8 Drawing Sheets

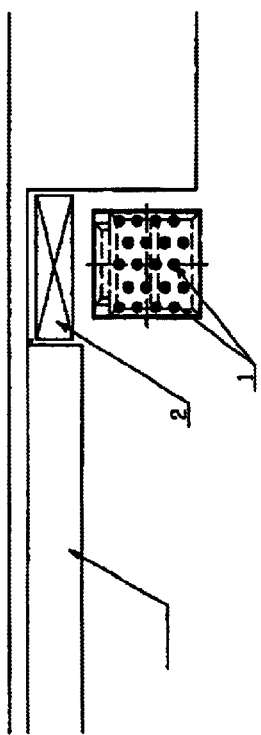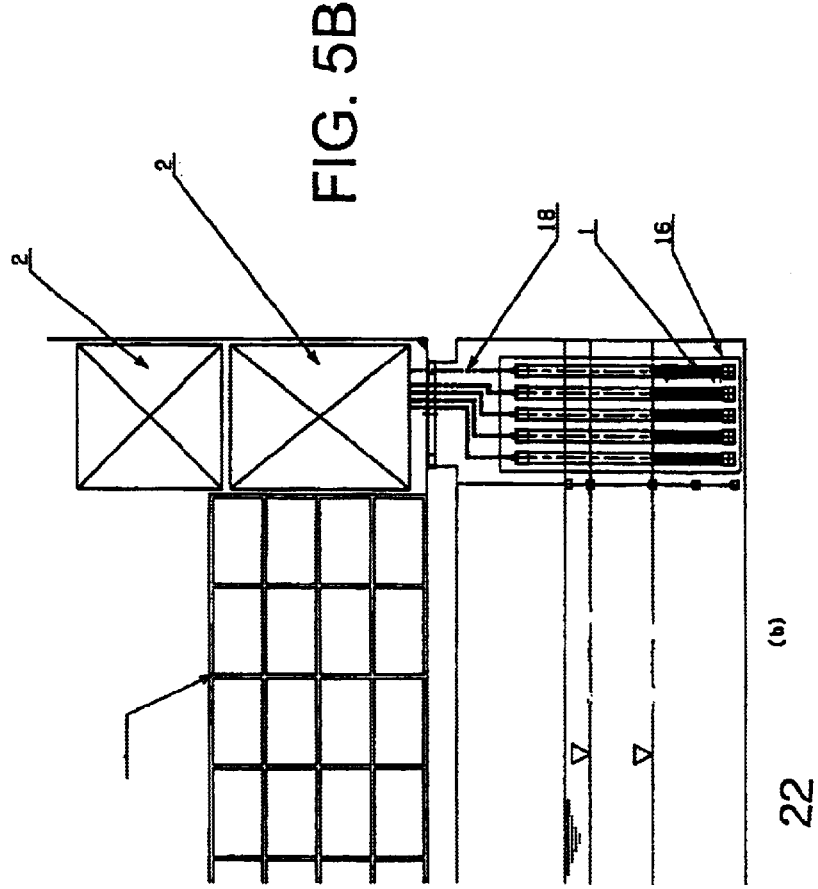

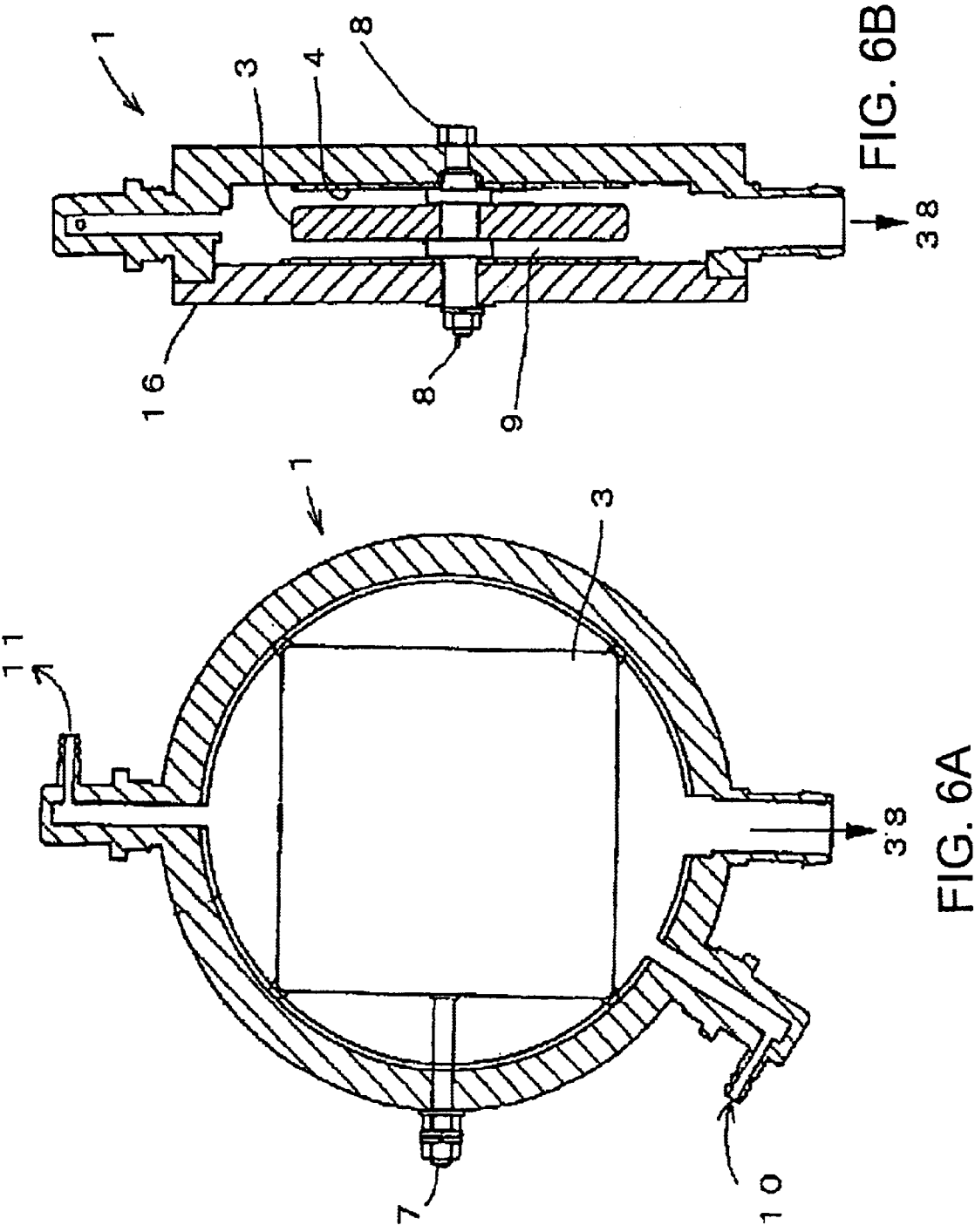

WATER PURIFICATION/STERILIZATION METHOD AND DEVICE THEREFOR

FIELD OF THE INVENTION

The present invention relates to a water purification/sterilization method and its device to be used, for example, with swimming pools, baths, 24-hour public baths, ponds, farming tanks, AC water, waste water from car wash services, and waste water from combined treatments.

BACKGROUND OF THE INVENTION

In a related field, water from, for example, a swimming pool, 24-hour bath, farming tank, or AC water is relatively well controlled for purification. In general, a swimming pool is purified and sterilized by employing sand filtration and the introduction of chlorine, and a 24-hour bath is purified through filtration and a biological treatment.

In general for a swimming pool, a coagulation treatment/sand filtration, and purification and sterilization through the introduction of chlorine are carried out. When the purification does not remain adequate for the number of people in the pool, the water gets foul and the clarity of the water becomes 7 to 8 m in the late afternoon, where it was 20 m or more in the morning.

When the water is foul, the number of bacteria increases and it is a sanitary problem. Therefore, the amount of chlorine introduced is increased. Consequently, problems are generated such as a chlorine smell remains and people are often irritated by the chlorine, such as by eye irritations, skin problem for their aims and legs or their hair is damaged.

In addition, a purification method using a coagulation treatment/sand filtration requires a frequent reverse filtration of the sand and consequently increased water consumption.

24-hour baths were popular and there were 1.2 million of them at the peak, however, an investigation carried out from the end of 1996 to February 1997 revealed that legionella bacteria were found in a wide range of water from a 24-hour bath and this created a social problem. It was discovered that the generally used biological treatment was actually providing a desirable environment for the propagation of legionella bacteria.

The present inventors have submitted the following patent applications that are related to a purification/sterilization method of water employing electrolysis and its device for water such as swimming pool, baths, 24-hour baths, farming tanks, ponds, AC water, wastewater from car washes, and wastewater from combined treatments.

Japanese Patent Laid-open Publication Nos. H06-296968/1994, "Water purification device for a swimming pool and bath," H08-089969/1996 "Water purification method and its device," H11-128942/1999 "Water quality purification method and its mechanism," H11-188364/1999 "Electrolyzing device," H11-207349/1999 "Water quality purification mechanism," H11-207350/1999 "Water quality purification mechanism," H11-207353/1999 "Water or waste water purification method and its device," 2000-046793 "Water foulness evaluation system" and 2000-140899 "Combined treatment purification system and its combined treatment purification device."

Of the patents disclosed above, the water purification/sterilization of swimming pools and baths through electrolysis was made possible in accordance with H06-296968 and H08-089969. As the anode of the electrolyzing device, a platinum-plated titanium electrode displaying the strongest corrosion resistance was used, however, when there were high loads, the electrolytic voltage became abnormally high in a short period of time. Thus, in accordance with the H11-188364 "Electrolyzing device", a ferrite anode through a new terminal bonding method was employed and consequently, 3 to 5 times longer endurance performance under the same conditions, compared to the platinum-plated titanium electrode, was achieved.

Nonetheless, there is a problem such that when the current value is increased in order to achieve a higher purification/sterilization effect, the terminal portion is heated. In addition, in order for easy installation in a compact place such as an existing bathtub or aquarium water, a purification/sterilization device that employs an electrolyzing device that is compact, durable without failure and safe, is desired. At the anode, halogen ion discharges negative electricity and the halogen that is deposited at the same time, due to a strong acid such as hydrochloride that is generated by hydrolysis, creates a low PH. Because it creates a strong acidic environment, an anode is required that has a high corrosion-proof electrode. Therefore, from past performance, a ferrite is selected, and a ferrite round rod or tube with a long hole in the direction of the center axis of the rod or tube or in the longitudinal direction is employed as an anode 1 in the center. Unlike a regular metal electrode, ferrite does not have a high electric conductivity, and because it is ceramic it is therefore hard and brittle, making it difficult to bond the terminal with a prior art such as welding. The present inventors have invented an electrolyzing device that resolves this problem, and have submitted a patent application published as 2000-168578. Nevertheless, the main objectives of this invention were to electrolyze a solution in which a high concentration of halogen ion is dissolved in regular tap water and then to create sterilized water with a high concentration of the remaining hydrochloride.

Water from a swimming pool, bath, pond, 24-hour bath, farming tank, or AC water has a low electric conductivity of 200 to 900 $\mu$S/cm. In addition, in order to purify foul water, a large electric current has to flow per electrode area. When adding, for example, sodium chloride increases the electric conductivity it corrodes the hardware of the swimming pool or bath, and it is not appropriate for freshwater farming. Furthermore, when a large amount of water is electrolyzed continuously for a long period of time, it creates a problem such as breakage occurs due to the deterioration and deformation of the electrode and the electrolytic cell due to the overheating of the electrode from the increase in electrolytic voltage.

SUMMARY OF THE INVENTION

The application of an electrolyzing device, employing a ferrite electrode for an anode, to water purification/sterilization for swimming pools, baths, ponds, 24-hour baths, farming tanks, and AC water has been known to be a superior purification/sterilization method, having a high purification/sterilization effect without harmful effects on humans and other organisms. However, for water with low electric conductivity, the electrolyzing device of the prior art has a problem with its durability.

The objectives of the present invention are to provide a compact foul water purification/sterilization method and its device employing an electrolyzing device with high efficiency of electrolysis wherein even under continuous operation for a long period of time in water with a low electric conductivity, the deterioration or breakage of the electrode or thermal deformation of the plastic case of the electrolyzing device does not occur.

In order to resolve the above-mentioned problem, the present invention employs the following means. In order to have a compact and durable structure in which there will be no leakage from the electrolyzing device, even after long-term use, a multiplicity of barrel-shaped anodes and cathodes are alternately arranged in a concentric manner in layers with intervals of 1.1 to 9 mm between electrodes, and in between the electrodes, water comprising a halogen ion is poured to be electrolyzed and sterilized.

With electrolyzing device 1 of the present invention, anodes 3 comprise ferrite pipes or rods, or conductive metal pipes or rods with a thermal sprayed ferrite film. The cathodes 4 comprise a conductive metal pipe. The electrolyzing device 1 is structured such that anodes 3 and cathodes 4 are alternately arranged in a concentric manner in layers with intervals of 1.1 to 9 mm between electrodes. Then, in between the electrodes, water comprising an electrolyte is poured and said water is electrolyzed. Anodes 3 are ferrite rods with a long hole along the central axis direction (longitudinal direction), or a ferrite pipe, in which a soft conductive metal with a low melting point of 6 or mercury is filled in the hole in advance. Then, the rod-shaped conductive terminal 5 is inserted therein. External to anodes 3, conductive corrosion resistance metal pipes are arranged in a concentric manner in layers as cathodes 4.

One or multiple electrolyzing devices 1 that are structured as above is/are stored at a right angle in a mesh or conductive protective case 16 having holes 17. Then they are directly installed by being immersed in the water of a bathtub, swimming pool, or farming tank that is the subject to be purified/sterilized. Alternatively, one or more of the electrolyzing devices 1 are installed in the external circulation line of the electrolyzing device. Then, in between the electrodes, used foul water that comprises a halogen ion, or foul water that is newly added with a solution comprising a halogen ion is supplied, and electrolysis can be carried out while the designated electric conductivity is maintained. Then, the purified/sterilized water is drained out from the container. In this case, when the electric conductivity of the subject water is low, it is acceptable for a solution of bromine ion, chlorine ion, or a mixture of bromine ion and chlorine ion, as a halogen ion to be added and the water purification/sterilization can be carried out while the designated electric conductivity is maintained.

The water purification/sterilization device of the present invention is to be directly installed by immersing it in water tanks, such as the water of a swimming pool, bathtub, farming tank, AC system, or installed in a balancing tank or water treatment tank of a water circulation line. Therefore, it is acceptable that it comprises a mesh or lattice-shaped corrosive resistant conductive metal protective case that allows grounding, one set or multiple sets of electrolyzing devices 1 in the case, a power source installed outside the tank, an operation control device, and a tank and pump for supplying the electrolyte. It is also acceptable that in the water circulation line, the electrolyzing device is installed upstream from the filter, so that the water purified by an electrolytic treatment, which contains hypohalogenous acid with a high oxidation power, created by electrolysis, penetrates the filter and circulates. In addition, when the filter is back washed regularly for cleaning purposes, a reverse switching valve is switched so that the water containing hypohalogenous acid with a high oxidation power reverse flows through the filter with a back wash line, and the water purification/sterilization is carried out. In this case, it is possible that during a long-term electrolysis, an electrolyzing device can be immersed in a solution of an inorganic acid such as hydrochloride, or an organic acid such as acetic acid, at given intervals of time, in order to remove deposits on the cathode of, for example, metal hydroxides. Moreover, it is acceptable that the purification/sterilization device is installed midway in the water circulation line, and it is structured such that there is: a compact water treatment tank in which an electrolyzed device is immersed in a purification/sterilization device; a supply tank, for a solution of an inorganic acid such as hydrochloric acid or an organic acid such as acetic acid, which is installed with a connection to said water treatment tank and a metering pump; a drainage means that is installed at the bottom of said water treatment tank; a power source and a control device that controls the operations, the control of the electrolysis, and the supply of an inorganic acid such as hydrochloride or an organic acid such as acetic acid, and drainage.

BRIEF EXPLANATION OF THE DRAWINGS

FIGS. 5A and 5B are planer views of an example of the installation of an electrolyzing device that shows 20 electrolyzing devices 1 of FIG. 2 being stored in the protective case 16. Then it is immersed in balancing tank 22 that is placed underneath the floor of the changing room of a swimming school.

FIG. 6A is a frontal cross-sectional view of an electrolyzing device of the prior art that is used as a comparative example in the present invention.

FIG. 6B is its side cross-sectional view.

PREFERRED EMBODIMENTS OF THE INVENTION

Figure 2A:
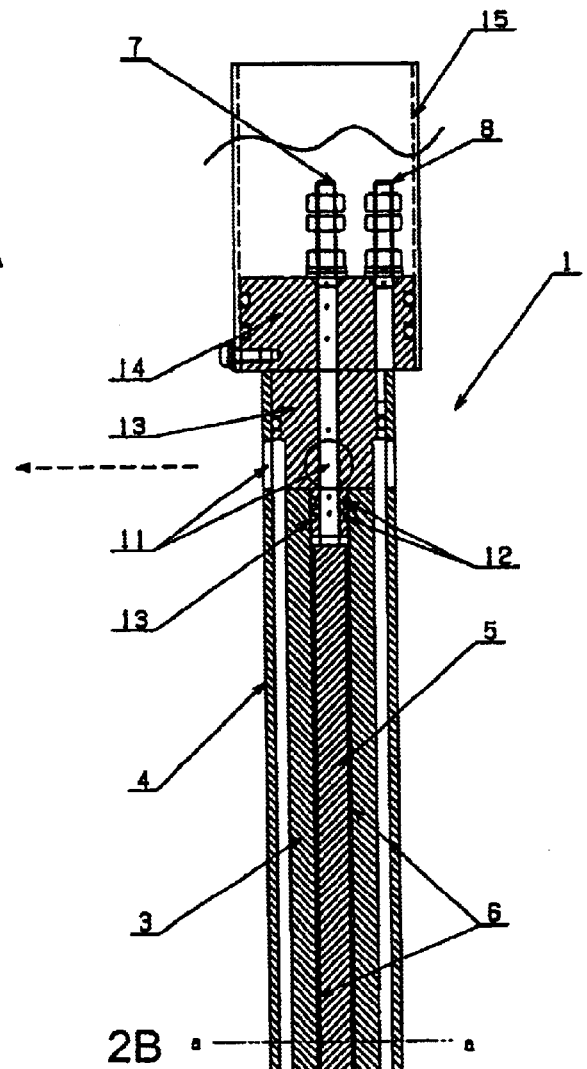
FIG. 2A is a cross-sectional view that shows the state in which a terminal body and metal bonding with a low melting point of 6 is inserted inside the anode for an electrolyzing device of the present invention that comprises barrel-shaped (cylindrical-shaped) anodes 3, and cathode 4.
Figure 2B:
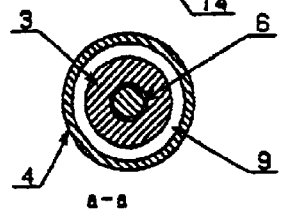
FIG. 2B is a cross-sectional planer view cut at the 2B—2B line in FIG. 2A.
Figure 3A:
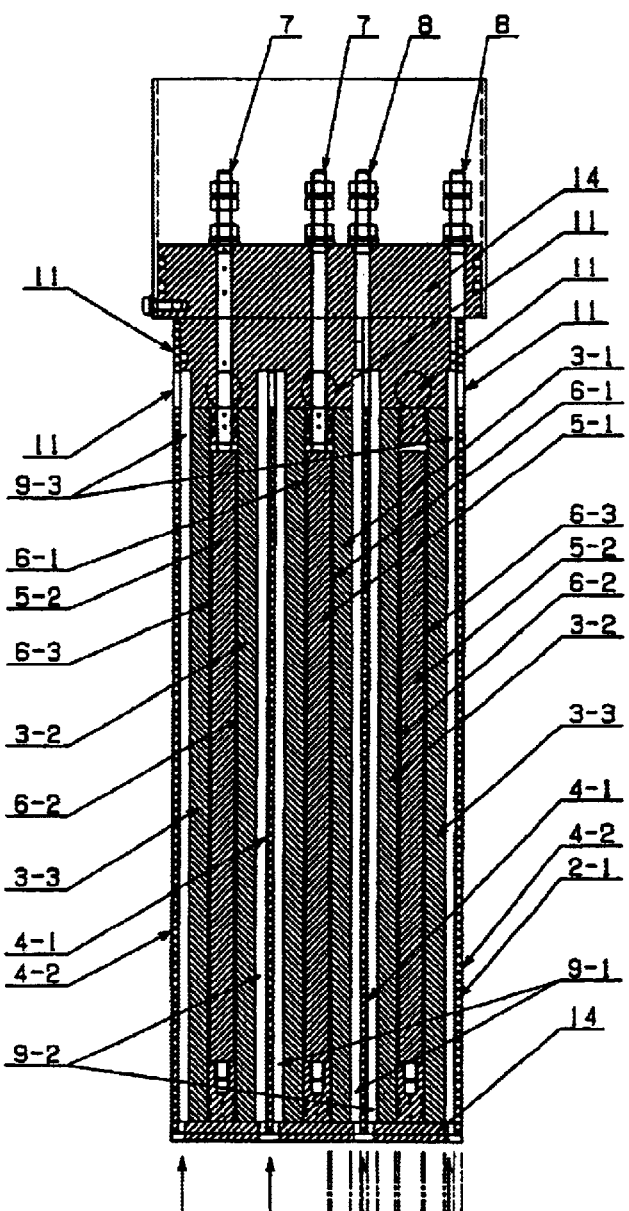
FIG. 3A is a cross-sectional view that shows the multiple electrodes in which additional anodes are arranged outside the cathodes 4 in FIG. 2.
Figure 3B:
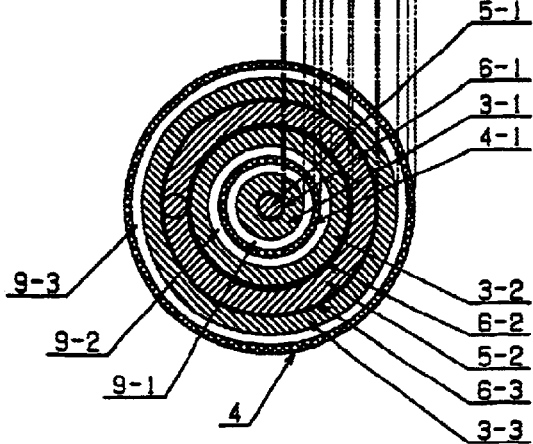
FIG. 3B is a cross-sectional planer view cut at the 3B—3B line in FIG. 3A.

The present invention has the following basic structure.

a) As electrolyzing device 1, ones that are shown in FIG. 2 or FIG. 3 are employed. In FIG. 2, anodes 3 and cathodes 4 are arranged and structured in a concentric manner in a layer. Water containing an electrolyte is introduced to the inter-electrode reactive portion 9 from the bottom introduction opening 10 of the electrolyzing device 1 as shown with the dotted arrowed line. Said water goes through the inter-electrode reactive portion 9 and then is drained from the drainage opening 11 as shown with the dotted arrowed line. At the inter-electrode reactive portion 9, electrolysis is carried out, and the oxidation decomposition of the foul components of the water such as COD material and ammonia is carried out, and at the same time, harmful microbe can sterilized. For the anodes 2, when ferrite anodes are arranged inside and titanium cathodes are arranged outside, the structure becomes simple and durable, allowing a simple assembly of a durable electrolyzing device when electrode fastening portion 14 and terminal 15 are installed on both sides. A pipe or a rod with a long hole along the direction of its center axis (longitudinal direction) made of nickel ferrite, or a barrel-shaped electrode thermally sprayed with nickel ferrite, which is said to have relatively good electric conductivity (low relative resistance) and the best corrosion resistance as an anode, are used as anodes 3. A barrel-shaped metal cathode with corrosion resistance and conductivity is used as cathodes 4.

b) In the electrolyzing device 1 in FIG. 2, when a ferrite pipe or rod is used for the center anodes 3, a soft conductive metal bonding portion with a low melting point or mercury 6 is filled in a ferrite rod with a long hole in the direction of its center axis (longitudinal direction) or a ferrite pipe in advance. Then, a rod-shaped terminal body 5 that corresponds to the length of the conductive electrode is inserted and a terminal is created. Outside thereof, as cathodes 4, conductive corrosion resistant metal pipes are arranged in a concentric manner with a designated interval between the electrodes. Anode terminal portion 7 and cathode terminal portion 8 are provided on anode terminal body 5 and cathode metal bonding portion 6, respectively, allowing an electric connection with outside.

In the embodiment in FIG. 2, anode 3 is a nickel ferrite pipe with an electrode area of 2.5 $dm^2$. Outside thereof, titanium pipes as cathodes 4 are arranged with an inter-electrode interval of 3 mm. On the bottom opening of the nickel ferrite pipe, sealing portion 13 is fit inside, they are fastened to the electrode fastening portion 14 with titanium pipes, an appropriate amount of mercury is poured while it stands vertically and then terminal body 5 is gently inserted. After confirming that the mercury level is exactly to the top of the terminal body, o-ring 12 and sealing portion 13 are fit inside over the hole of the nickel ferrite pipe. Then the entirety is fastened with electrode fastening portion 14 while anodes terminal 3 and cathodes terminal 4 are penetrated through. Then the metal bonding portion with a low melting point or mercury 6 is sealed.

In the electrolyzing device 1 shown in FIG. 3, anodes 3-1, 3-2 and 3-3 are made of ferrite pipes or rods, and cathodes 4-1 and 4-3 are alternately arranged and thus create inter-electrode reactive portions 9-1, 9-2 and 9-3. Between the two anode ferrite pipes 3-2 and 3-3, which have different center diameters, a conductive metal bonding portion with a low melting point or mercury 6-2, 6-3 is filled in advance, and then rod-shaped terminal body 5-1 and barrel-shaped terminal 5-2 are inserted, respectively. On the outside thereof, cathodes 4-1 and 4-2, which are conductive corrosion resistant metal pipes, are arranged with an appropriate inter-electrode interval. Anode terminal portions 7 are arranged on each of anode terminal bodies 5-1 and 5-2, and cathode terminal portions 9 are arranged on each of cathodes 4-1 and 4-2, allowing electrical contact with the outside. Water containing an electrolyte is introduced into the inter-electrode reaction portions 9-1, 9-2 and 9-3 from the bottom introduction opening 10, as shown with the arrow. The water goes through the inter-electrode reactive portions 9-1, 9-2 and 9-3 and is drained from a multiplicity of drainage openings, as shown with an arrow. At the inter-electrode reactive portions 9-1, 9-2 and 9-3, electrolysis is carried out in a similar manner to the embodiment shown in FIG. 2, and oxidation decomposition of the foul components of the water such as COD material and ammonia is carried out using a strong anode oxidation effect, and, at the same time, harmful microbes can be sterilized.

The relative resistance of normal electrode material is: gold=2.4; iron=10; platinum=11.6; titanium=55 and SUS304=72 $\mu\Omega$cm. The relative resistance of nickel ferrite is significantly larger at 20,000 $\mu\Omega$cm. Therefore, having a mere nickel ferrite electrode somewhere will not allow an electric flow with low resistance to the entire electrode.

In the present invention, each of terminal bodies 5, 5-1 and 5-2 come in contact with the entire internal surface of anode nickel ferrite pipes 3 and 3-1, and the entirety between the anode nickel ferrite pipes 3-2 and 3-3, respectively, so that the flow route between terminals and the surface of the nickel ferrite electrode is short. In addition, the gap between them is set to be approximately 0.5 to 1.5 mm. Then, pipe-shaped metal bonding portions with low melting points 6, 6-1 and 6-3 for which the external diameter is the same as the internal diameter of nickel ferrite pipes 3, 3-1 and 3-3 and the thickness is slightly greater than the gap, or a pipe-shaped metal bonding portion with a low melting point 6-2 for which the external diameter is the same as the internal diameter of nickel ferrite pipe 3-2 and the thickness is slightly greater than the gap, are inserted in advance, and then, terminal bodies 5, 5-1 and 5-2 are inserted.

The metal bonding portions with a low-melting point 6, 6-1, 6-2 and 6-3 have a low-melting point and are soft. Therefore, when terminal bodies 5, 5-1 and 5-2 are inserted, a low-melting point metal is pushed in between the terminal bodies 5, 5-1 and 5-2 and nickel ferrite pipes 3 without a gap, therefore allowing it to act as an electrical binder between terminal bodies 5, 5-1 and 5-2 and nickel ferrite pipes 3, 3-1, 3-2 and 3-3.

At this time, if a low-melting point metal is used in a fluent state by heating it to around its melting point, or mercury, which is a liquid at ordinary temperatures is used, it is more preferable. Mercury makes a mercury amalgam with, for example, copper, tin or lead. When the terminal bodies 5, 5-1 and 5-2 are made of these metals, even if the gap with the nickel ferrite electrode is narrower, the surface of the terminal bodies 5, 5-1 and 5-2 are soft and amalgamated, allowing better adhesiveness.

c) An electrolyzing device 1 is assembled by combining one of more barrel-shaped (cylindrical-shaped) anode(s) 3 and cathode(s) 4 alternately in a concentric manner. One or multiple sets thereof is/are stored in the conductive protective case 16 with grounding so that it stands vertically. The protective case can be a conductive metal case, or a plastic or wooden case with conductive naked cables or thin and long metal plates attached in a lattice shape or a mesh that allows stray current to escape through grounding.

Figure 1:
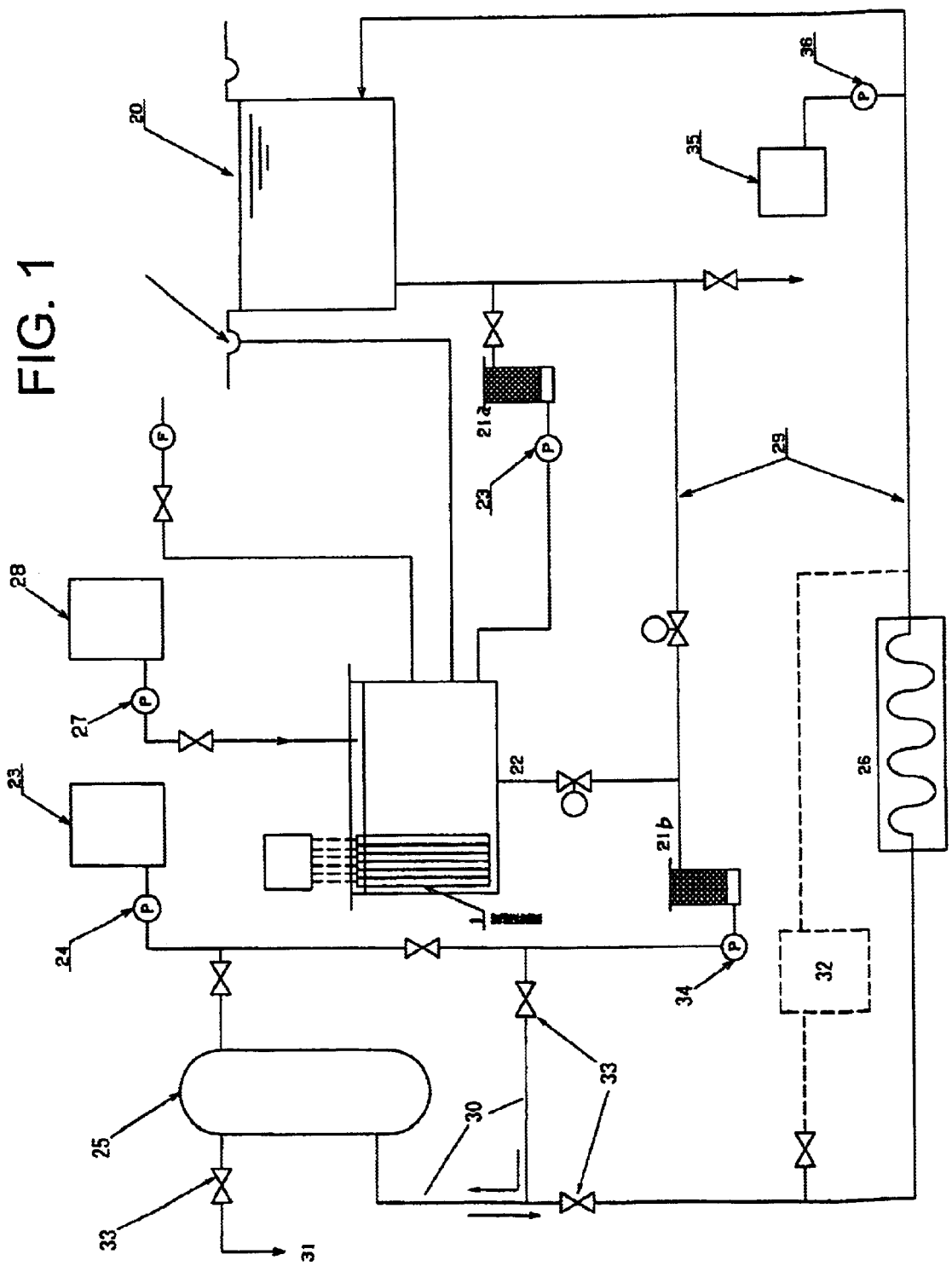
FIG. 1 is a system flow chart that shows the installed purification/sterilization device for swimming pools, etc., in accordance with the present invention.

The electrolyzing device is immersed and fastened in the water of the subject. Then, in between the electrodes, used foul water containing halogen ions, or foul water added with a solution containing halogen ions are supplied. Then the electrolysis is carried out and the purified/sterilized water can be taken out from the container.

d) The tap water used as the water contains a small amount of halogen ion, however, its electrical conductivity is approximately 200 to 370 μS/cm and it is too low to purify the foul water. Therefore, a solution added with a bromide ion, chloride ion or a mixture of bromide ions and chloride ions, is added to the water and by keeping the lowest tolerable level of electrical conductivity for the water, which is approximately 400 to 900 μS/cm, the electrolysis, in general, is continued e) The water purification/sterilization provided by the present invention can be structured such that the electrolyzing device is immersed directly in the circulating water, however, in order to prevent the leakage of stray current into the water during the electrolysis, one or a multiplicity of electrolyzing device(s) 1 is/are stored in the mesh or lattice-shaped corrosion resistant conductive metal protective case 16.

f) In FIG. 1, it is acceptable that in the water circulation line 29, the electrolyzing device 1 is installed upstream from the filter 25, so that the water purified by an electrolytic treatment containing hypohalogenous acid with a high oxidation power, which is created by electrolysis, penetrates the filter, allowing the oxidation decomposition of the foul components that adhere to filter 25, consequently reducing the clogging.

Figure 8:
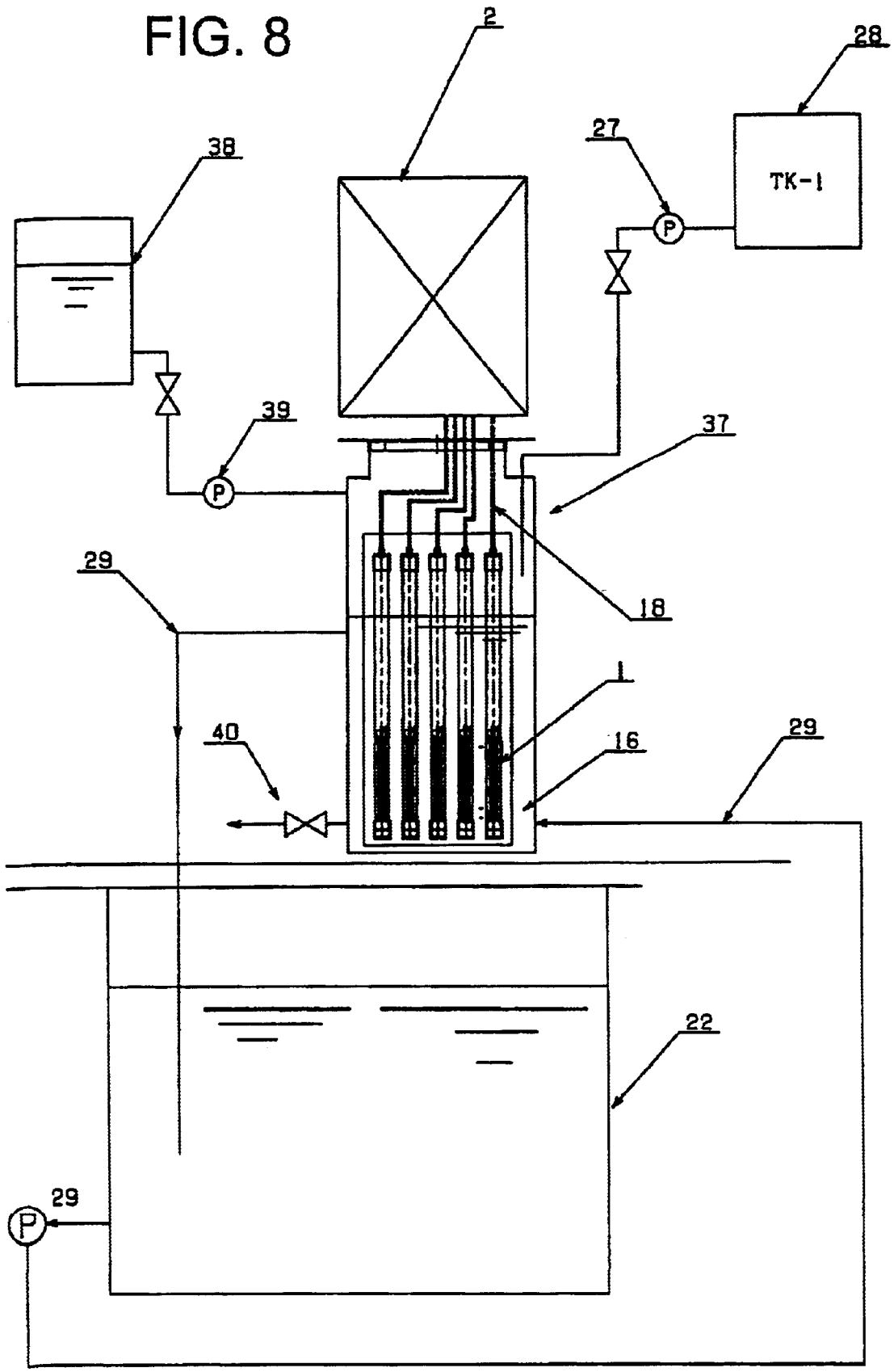
FIG. 8 is a flow chart that shows the area around the water treatment tank of the present invention.

In addition, when the filter is back washed regularly for cleaning purposes, a reverse switching valve 33 is switched so that the water containing hypohalogenous acid with a high oxidation power reverse flows through the filter 25 with a back wash line 30. In FIG. 1, the arrow 29' shows the flow direction of the water in the normal water circulation line and the arrow 30' shows the flow direction of the water during the reverse washing.

g) When hard components that exist in water such as Ca and Mg are electrolyzed, metal hydroxides are deposited on the cathodes. When these are left for a long period of time, they turn themselves into insoluble carbonates or sulfates and the electrolysis efficiency is reduced. The (deposition on) one that went though a long period of electrolyzing, and was left, and in addition, was left in a condition that allowed contact with air cannot be dissolved and removed unless it is immersed in a 5 to 10% hydrochloric acid solution for more than a day. However, when it is immersed in a solution of light hydrochloric acid at a relatively early stage, it can be fully dissolved and removed in around 15 minutes. For this purpose, inorganic acids such as a 0.2 to 10%, and preferably a 1 to 5% solution of hydrochloric acid or phosphoric acid can be used. Organic acids such as acetic acid can be used. In any event, it is desirable to adjust the pH to be 0.5 to 3.

h) In the embodiment in FIG. 8, compact water treatment tank 37 is installed midway in the water circulation line 29, and the electrolyzing device 1 is dipped in there. Then electrodes are washed with acid with the water treatment tank 37 at each interval of time, which is calculated from the hardness of the water. The circulation of the water is stopped and then a certain amount of solution of hydrochloric acid, etc., is poured from the supplying tank 38 into the water treatment tank 37 for the inorganic acid solution such as hydrochloric acid, using a metering pump 39. By the air lifting effect of the electrolyzing device 1 of the present invention, the mixing and circulation is carried out inside and outside the electrolyzing device, and it is sufficient to have oxidation immersion once a week for 10 to 15 minutes for a regular swimming pool. In addition, when the electrical conductivity of the water is low, the electrolyte solution stored in the tank 28 is supplied from the supplying pump of electrolyte solution 27. (See FIG. 1 and FIG. 8.) The electric power required for the electrolyzing device 1 is supplied from electric power/controller 2.

MODE FOR CARRYING OUT THE INVENTION

The mode for carrying out the invention is described in accordance with an embodiment for a swimming pool, by referring to figures as follows.

The purification/sterilization method of the present invention can be effectively applied to a wide range of water purification/sterilization applications such as swimming pools, bathtubs, ponds, 24-hour baths, farming tanks, AC water, wastewater from washing, combined treatment water (when it is recycled as a treated water supply, use it as the secondary purification process), etc. FIG. 1 is a flow chart that shows the implementation. The swimming pool 20 can be a public bath or farming tanks, etc. The electrolyzing device 1 is either directly immersed in the water tank 20 such as a swimming pool, bathtub, farming tank or AC, or is installed in the balance tank 22 or the water treatment tank 37 in the water circulation line 29. Therefore, said electrolyzing device 1 is stored in a protective case 16 made of mesh or a lattice-shaped corrosion resistant metal with grounding. One set of or multiple sets of said electrolyzing device can be stored in the protective case 16. External to the water tank 20, a power source, an operation control device 2 and an electrolyte solution supply means 27 are provided.

The water taken out from the swimming pool 20 is sucked through the water circulation line by pump 43 and then introduced to the balancing tank 22 via a strainer (hair catcher) 21a. The balance tank 22 is provided with a multiplicity of electrolyzing devices 1 of the present invention and purification and sterilization is carried out. The electrolyte solution is supplied from the electrolyte solution supply tank 27 via an electrolyte supply pump as required, and the overflow from the pool or tap water is supplied to the balance tank. The water that is purified and sterilized in the balance tank goes through the water circulation line 29 by the circulation pump 32, and is supplied to the filter (sand filtration) 25 via strainer 21b and back wash switching valve 33. The coagulation agent is supplied from the coagulation agent supply tank 23 by the coagulation agent supply pump 24 to the filter 25. The back wash line 30 having the back wash line water exit 31 is connected to the filter 25. The water filtered through the filter 25 has its temperature adjusted by the heat exchanger 26, and is returned to the swimming pool 22 via the water circulation line. Disinfectant is supplied from the disinfectant tank 35 by the disinfectant pump 36 to the water circulation line 29.

FIG. 8 is a flowchart with a water treatment tank from the present invention. A water treatment tank containing electrolyzing device 1 in protective case 16 is provided separately from the balancing tank 22. Electric power is supplied to the electrolyzing device 1 for purification and sterilization via electric cable 18 from the power source/control device 2. Electrolyte is supplied as required from the electrolyte solution supply tank 28 by an electrolyte solution supply pump 27 to the water treatment tank 37. An inorganic acid or organic acid solution is supplied from the inorganic acid or organic acid solution supply tank 38 by the metered pump 39.

The water that is purified and sterilized at the water treatment tank 37 is supplied to the balancing tank 22 via water circulation line 29 and then returned to the water treatment tank 37 again using the circulation pump 34 via water circulation line 29. The water in the water treatment tank 37 is drawn from the drain 40 as required. The water stored in the balance tank 22 is used as required.

Embodiment 1

Using FIG. 1, the water purification and sterilization of a swimming pool is described.

It is an embodiment for a swimming school in which the size of the pool is 25 m×15 m, the water amount is 400 m$^3$, and the number of visitors per day is 450 to 780 people (average 570 people/day).

The water of the swimming pool is clean during the morning, however, it becomes foul due to dirt, sweat or grease from human bodies. The water temperature is kept at 30 degrees, creating an environment where microbes such as bacteria can easily propagate. In this swimming pool, currently, purification and sterilization is carried out using the coagulation process/sand filtration and the introduction of chlorine. However, the purification capacity cannot keep up as the number of visitors increases, and the water gets foul and the clarity of the water becomes 7 to 8 m in the late afternoon where it was 20 m or more in the morning.

When the water is foul, the number of bacteria increases and it is a sanitary problem. Therefore, the amount of chlorine introduced is increased. In order to recover clarity during the night, after operation hours, an excess amount of chlorine is introduced. Consequently, even in the morning, a chlorine smell remains, and even at the poolside, the chlorine irritates often eyes. There also are problems such as skin problems of the arms and legs and hair is damaged. Therefore, water purification and sterilization using electrolysis became the method of choice.

The method of purification/sterilization carried out in this swimming pool is such that, a coagulation agent is added from the coagulation agent supply tank 23 by supply pump 24 to the circulation water. Then, the dirt in the water is coagulated and removed by flowing through the filter (sand filtration) 25. Then, the water temperature is adjusted with the heat exchanger 26, and disinfectant from the disinfectant tank (chlorine) 35 is added to the circulation water using the disinfectant supply pump 36.

The present invention takes advantage of the existing pool facilities for purification and sterilization, and significantly improves the water quality while reducing the amount of water, chemicals, electric power and fuel, etc., that are used.

Figure 4:
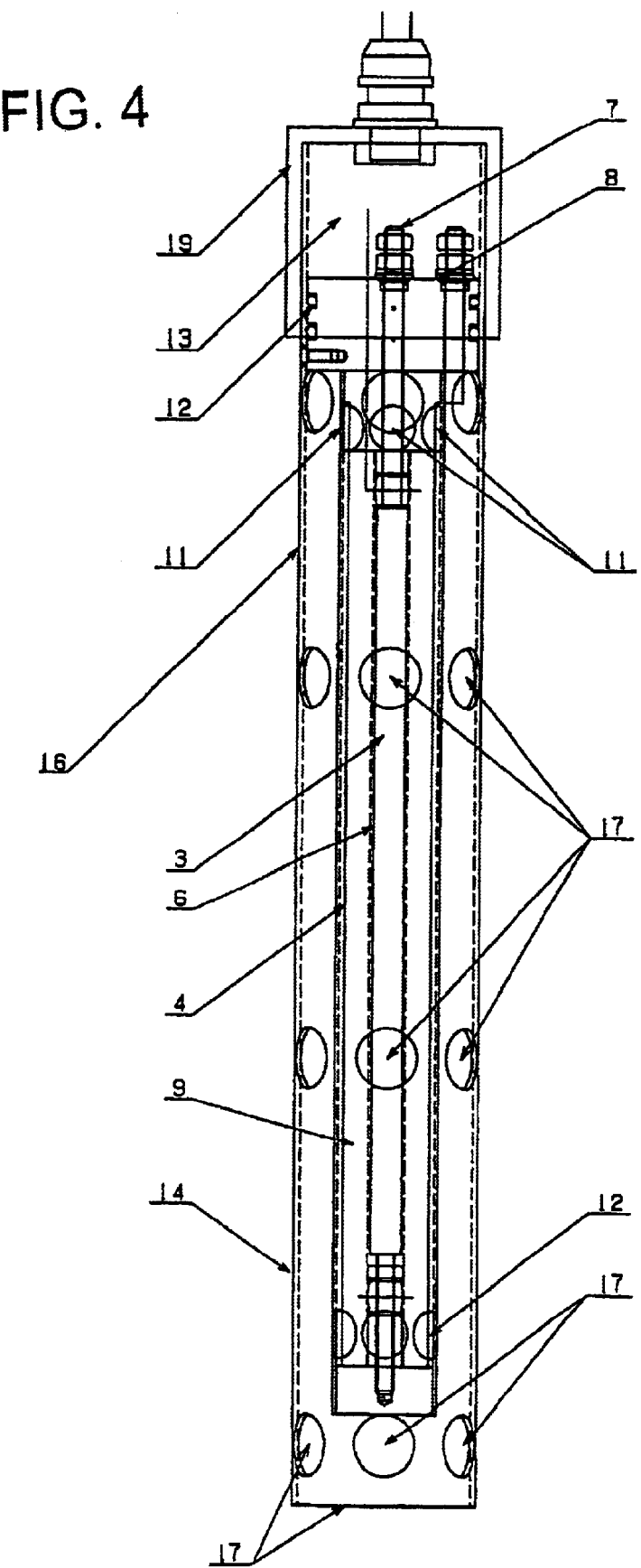
FIG. 4 is a side view (partial cross-sectional view) in which a stainless pipe with holes is installed as protective case 6, so that only one electrolyzing device 1 of FIG. 2 is immersed in water.

FIG. 4A and FIG. 4B show a situation in which 20 cells of the present electrolyzing device 1 are stored in protective case 16, and directly immersed in the water of the swimming pool in balance tank 22. From the power source/operation control device 2 installed in the corner of the changing room, electric cable 18 is connected to the electrolyzing device 1 and the electric power is supplied and the electrolyzing device 1 is controlled.

Table 1 shows the results of an approximately 8-month implementation. For the comparison, the conventional method was employed for 2 weeks until the test run for the purification/sterilization using electrolysis, and a water quality analysis was carried out in the same manner during the test. Here, the conventional method is such that coagulated materials generated by the introduction of a coagulation agent are removed by sand filtration, then after the operation hours of the swimming pool, an excess amount of chlorine (3.9 Kg to 4.3 Kg) is introduced, which causes a bleaching and oxidation effect from the chlorine until the morning.

For both the conventional method and the method of the present invention, water was sampled at 9 a.m. and 7 p.m. With the conventional method, while people are in the swimming pool during operation hours, a large amount of chlorine cannot be added therefore, after hours, an excess amount of chlorine was introduced and purification took place during the night.

TABLE 1

| | | Conventional method | | The electrolyzing device and method of the present invention | | | | | | |
|---|---|---|---|---|---|---|---|---|---|---|
| | | 1 wk. | 2 wks. | 1 wk | 2 wks. | 1 mo. | 2 mos. | 4 mos. | 6 mos. | 8 mos. |
| Remaining chlorine Mg/lit. | 9 a.m. | 1.2 | 1.3 | 0.8 | 0.7 | 0.7 | 0.6 | 0.8 | 0.8 | 0.7 |
| | 7 p.m. | 0.01 | 0.02 | 0.1 | 0.2 | 0.2 | 0.3 | 0.4 | 0.3 | 0.4 |
| KMnO$_4$ ppm | 7 p.m. | 8.3 | 7.5 | 5.3 | 4.1 | 3.3 | 3.1 | 2.6 | 2.8 | 2.6 |
| Ammoniacal nitrogen Ppm | 9 a.m. | 0.11 | 0.08 | 0.06 | 0.03 | 0 | 0 | 0 | 0 | 0 |
| | 7 p.m. | 0.26 | 0.31 | 0.18 | 0.12 | 0.11 | 0.06 | 0.07 | 0.08 | 0.05 |
| Clarity m | 9 a.m. | 20 | 20 | 20 | 25 | 30 | 30 | 30 | 30 | 30 |
| | 7 p.m. | 8 | 10 | 10 | 15 | 15 | 20 | 18 | 20 | 20 |
| Introduced chlorine kg/day | | 4.3 | 3.9 | 1.2 | 0.8 | 0.5 | 0.5 | 0.4 | 0.4 | 0.3 |
| Electrolytic cell replacement | | | | Not required | Not required | Not required | Not required | Not required | Not required | Not required |

According to Table 1, with the conventional method, even though the remaining chlorine at 9 a.m. is a high 1.2 and 1.3, when night comes, it becomes a very low 0.01 and 0.02. When the remaining chlorine value exceeds 1, standing at the poolside makes one sense the strong smell of chlorine. In addition, swimming in the pool makes eyes redden and become irritated. In contrast, with the purification/sterilization method of the present invention, the remaining chlorine concentration is as low as 0.8 or less. Therefore, there is no strong smell of chlorine and the eyes are not irritated. In accordance with the swimming pool water quality standard of the Ministry of Health and Welfare, the desirable remaining chlorine concentration is 0.4 mg/lit. or more and 1.0 mg/lit. or less. With the conventional method, the clarity in the late afternoon becomes 10 m or less. With the conventional method, if the pool is observed from the top at the poolside, it satisfies the water quality standard, however, during operations, it is desired to have clarity of 10 m or more and more preferably 20 m or more in the water. In this example the clarity was measured by having a swimming coach with water goggles dive in at one end of the pool and then another coach stand in the water. Then the distance where the first coach could clearly see the patterns of swimming was measured. Other water quality analyses were carried out in accordance with the service water test method.

A test of the purification sterilization device and the method of the present invention were started in March. The operation results up to October are shown in Table 1 as the average value for the period. It operated by maintaining a low remaining chlorine concentration in which a chlorine smell could not be sensed, and additionally, it demonstrated superior water quality data related to, for example, $KMnO_4$ consumption and the ammonium concentration, and also the clarity of the pool water was, in particular, good. Students at the school, in particular, the women, gave good reviews, stating that it did not irritate their skin or eyes, and that hair damage was eliminated.

Embodiment $2^{2+}$

Figure 7B:
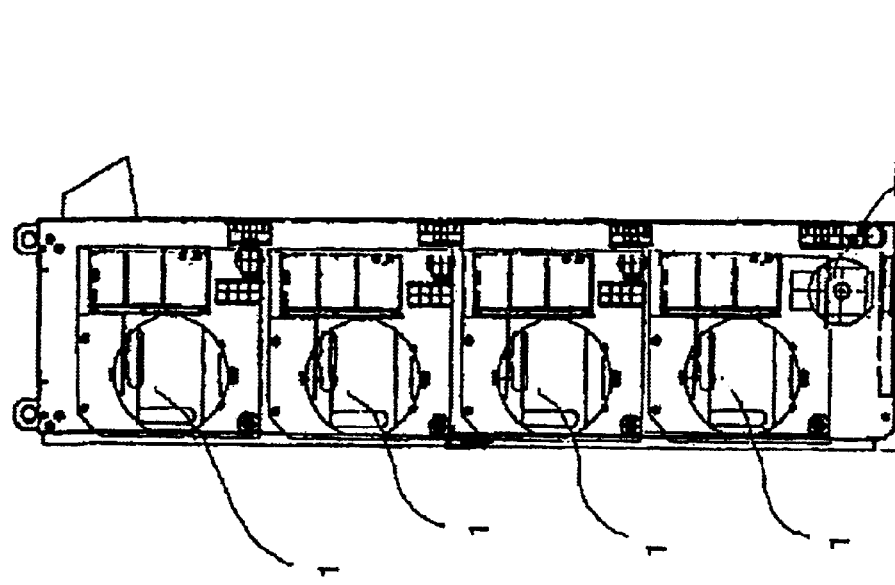
FIG. 7B is its side cross-sectional view. It is a cross-sectional view in which a total of 32 cells of electrolyzing device 1 are assembled in 4 layers.
Figure 7A:
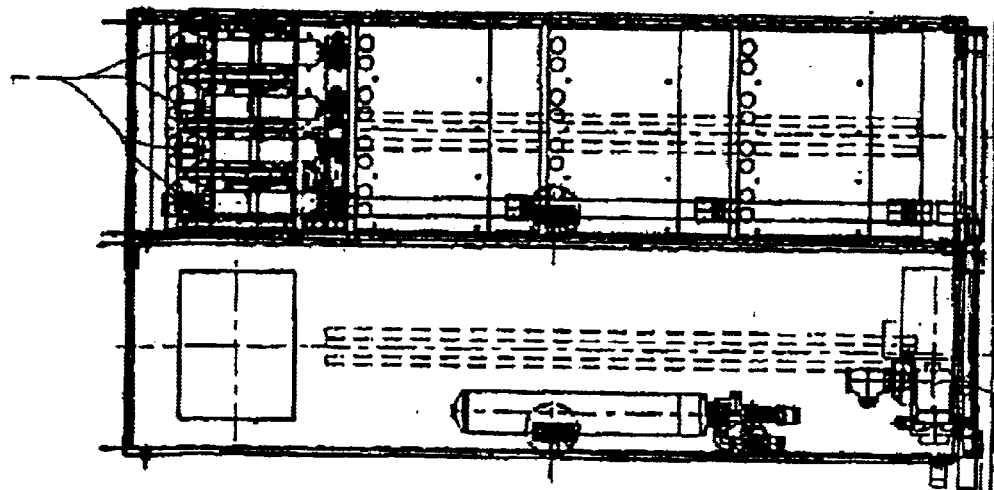
FIG. 7A is a frontal cross-sectional view that shows the assembly of an electrolyzing device of the prior art that is used as a comparative example in the present invention.

For comparison purposes with the present invention, FIG. 7 shows a purification/sterilization device assembled in accordance with the JP H11-207349 "Water purification mechanism" in which 32 electrolyzing devices are arranged in four layers having a nickel ferrite anode with an electrode area of 4 $dm^2$ and using the terminal bonding method that was previously developed by the present inventors in the JP H09-369487 "Electrolyzing device". The old electrolyzing device 32 is shown as a dotted line in FIG. 1.

This device was implemented in the same sized pool, in a swimming school, 2 years after Embodiment 1 of the present invention.

As in Embodiment 1, the operation with the conventional method was carried out for 2 weeks and water quality, etc., was recorded, and then without replacing the water of the pool, the operation was started. The water quality was gradually improved, and the amount of chlorine introduced was reduced. It is natural that *e-coli* was not found after 2 months, but general bacteria was reduced from $10^3$ CFU/ml to 10 CFU/ml, to a level to which chlorine was hardly required. However, after approximately 3 months, the electrolytic voltage exceeded the set value and the number of replacements for maintenance increased and the test was stopped. The objectives of water purification and sterilization were achieved more than satisfactorily, however, the electrode was not sufficient for a pool with a low electrical conductivity of 400 to 700 $\mu$S/cm.

Table 3 is a comparison between the performance of the individual parts of the new electrolyzing device 1 in Embodiment 1 and the old electrolyzing device 32 in Embodiment 2. The old device has 32 cells of 4 $dm^2$ (electrode area) and 8.4 KWH (used electric power), and the new device has 20 cells of 2.5 $dm^2$ (electrode area) and 4.1 KWH (used electric power) for a standard $400M^3$ sized pool, namely they correspond with each other, except for being ½ size. In addition, while having 3 amps and 4.8 amps per 1 $dm^2$ of electrode area, the new device has a low voltage of 17V for the electrolysis of 500 $\mu$S/cm water. Regarding the electrolysis performance, when 4 L of water is circulated and electrolyzed the same 48 mg/L of remaining chlorine concentration is achieved in 60 min. The new device is immersed in 4 L of water and natural circulation and agitation is carried out without using a pump.

TABLE 3

Comparison of the old and new electrolyzing devices for the electrolysis of 500 $\mu$S/cm water

|  |  | Old device Embodiment 2 | New devices Embodiment 1 |
|---|---|---|---|
| Shape of anode |  | Square | Barrel shaped |
| Area | $dm^2$/cell | 4 | 2.5 |
| Total electrode area | $dm^2$ | 128 | 50 |
| #of cells used |  | 32 | 20 |
| Current | A (amps) | 12 | 12 |
| Voltage | V | 22 | 17 |
| Watt/cell | W | 264 | 204 |
| Watts used | W | 8448 | 4080 |
| Electrolyzing performance | Increase in remaining chlorine concentration mg/L Time (min.) | 4 L of water in the container is circulated with a pump | Immersed in 4 L water container |
|  | Start  0 | 0  mg/L | 0  mg/L |
|  | 20 | 20.2 | 21.1 |
|  | 30 | 32.1 | 33.4 |
|  | 60 | 48.8 | 48.2 |

Embodiment 3

This is an example of purification/sterilization of a 24-hour bath. A 24-hour bath has been widely used in

TABLE 2

| Embodiment 2 |  | Old device Conventional method | | The previous electrolyzing device | | | | | | Water standard for swimming pool |
|---|---|---|---|---|---|---|---|---|---|---|
|  |  | 1 wk. | 2 wks. | 1 wk. | 2 wks. | 1 mo. | 2 mos. | 3 mos. | 4 mos. |  |
| Remaining chlorine mg/l | 9 a.m. | 1.2 | 1.4 | 1.1 | 0.9 | 1.1 | 0.8 | 0.8 | 0.6 | 0.4–1.0 |
|  | 7 p.m. | 0.01 | 0.2 | 0.2 | 0.3 | 0.2 | 0.3 | 0.2 | 0.2 |  |
| $KMnO_4$ mg/l | 7 p.m. | 5.5 | 6.2 | 4.3 | 3.8 | 3.5 | 3.2 | 2.5 | 3.1 | 12 or less |
| Ammonium ($NH_4^+$) mg/l | 9 a.m. | 0.06 | 0.05 | 0.02 | 0.02 | 0 | 0 | 0 | 0.01 |  |
|  | 7 p.m. | 0.19 | 0.21 | 0.15 | 0.12 | 0.11 | 0.08 | 0.09 | 0.12 | 0.1 or less |
| Clarity m | 9 a.m. | 20 | 18 | 25 | 25 | 30 | 30 | 30 | 30 | The entire pool floor can be seen |
|  | 7 p.m. | 5 | 8 | 14 | 14 | 15 | 14 | 17 | 15 |  |
| Introduced chlorine | kg/day | 3.5 | 3.4 | 1.5 | 1.2 | 0.8 | 0.3 | 0.5 | 0.8 |  |
| Electrolytic cell replacement |  | — | — | — |  | 1 | 5 | 9 |  |  |
|  |  |  |  |  |  |  | Test stopped |  |  |  | nursing homes and maternity clinics, however, recently, accidents due to legionella bacteria have been a problem. Therefore, the conducting of a test of the purification/sterilization of a bath containing legionella bacteria was carried out in accordance with the present invention.

The conditions were: amount of bath water: 80 L, temperature: 40 degrees, sample bacteria: 1. *Legionella pneumophila* serovar 5 RIMD1208013, 2. *Legionella bozemanii* RIMD1209001

Only one purification/sterilization device, in which an electrolyzing device 1 of FIG. 1 was covered with a stainless pipe with holes 17, which is protective case 16, as shown in FIG. 4, was immersed in 8-L of warm water. The electrical conductivity of the tap water was set to be 500 $\mu$S/cm and purification/sterilization was carried out with electrolysis. In the primary test, a mole ratio of 4:6 of chlorine ions and bromine ions demonstrated the best results so that this mole ratio was employed. A throw-in type electric heater was used to heat the water to 40 degrees and the air lifting effect of the purification/sterilization device itself was relied on for agitation.

The sample bacteria was cultured for 48 hours at 36 degrees in a BCYE-alpha agar medium, and treated with the regular method. It was adjusted to be $10^7$ cfu/ml and a bacteria solution was created and added to the 800 ml bathtub, which is 1/100 of the bathtub water. After that, 200 ml of tub water was sampled in every designated period of time and it was cultured and observed with the regular method.

The results are shown in FIGS. 4 and 5. The sterilization effect was observed with the clean tub, and therefore a serum as organic material was not added. In Table 4, the number of bacteria was significantly reduced 15 minutes after the electrolysis was started, and after 30 minutes, there were no bacteria observed. When electrolysis is not carried out the number of bacteria hardly changed in this amount of time.

TABLE 4

| | Without adding serum | |
|---|---|---|
| Sample bacteria | Legionella pneumophila | Legionella bozemanii |
| 0 min. after inoculation | 7 × $10^5$ cfu/ml | 5 × $10^5$ cfu/ml |
| 15 mins. | 12 cfu/ml | 5 cfu/ml |
| 30 mins. | — | — |
| 1 hr. | — | — |
| 2 hrs. | — | — |
| 4 hrs. | — | — |
| 6 hrs. | — | — |

Table 5 is a model for a foul bathtub when serum is added as organic material so that the COD becomes approximately 10 mg/L. Although it took a little more time compared to the case in Table 4, it was possible for the Legionella to be completely sterilized. At first the COD was 10.3 mg/L, but it was reduced to 6.2 mg/L after 1 hour, 5.6 mg/L after 2 hours and 4.5 mg/L after 4 hours.

TABLE 5

| | With Serum | |
|---|---|---|
| Sample bacteria | Legionella pneumophila | Legionella bozemanii |
| 0 min. after inoculation | 4 × $10^5$ cfu/ml | 7 × $10^5$ cfu/ml |
| 15 mins. | 250 cfu/ml | 330 cfu/ml |
| 30 mins. | 35 cfu/ml | 60 cfu/ml |
| 1 hr. | — | — |
| 2 hrs. | — | — |
| 4 hrs. | — | — |
| 6 hrs. | — | — |

The present invention is structured as described above and has the following advantages.

In accordance with the present invention, using a ferrite pipe or rod, or a conductive metal pipe or rod on which thermal sprayed ferrite film is formed on the surface of the metal allows the creation of an electrode that is inexpensive and which possesses performance that does not deteriorate over a long period of time compared to a platinum-plated electrode, which is said to have the highest corrosion resistance. The electrodes are in a barrel shape and the anodes and cathodes are alternately arranged in a concentric manner in layers. It is compact and has a durable structure. In addition, the vinyl chloride resin case that is typically used can be made into a barrel-shaped simple and durable structure. Consequently, there is no leakage from the electrolyzing device even after long usage. In addition as shown in FIG. 2, fastening the electrolyzing device by installing all the terminals on the top edge so that a portion of the terminal cover 5 comes above the water surface, allows it to be directly installed in the water container of the subject without placing it in a durable case. In addition, the heat generated at the electrode portion is absorbed and chilled by the water of the container. The water in the container is sucked into the electrolyzing device and electrolyzed by the air lifting, namely the bubbles of gas generated at the inter-electrode reactive portion 10 and it's raising, and is discharged. Therefore, without having a pump, the water in the container is automatically circulated and electrolyzed and the remaining chlorine concentration can be raised.

In the present invention, the use of nickel ferrite electrodes as an anode has a significant effect on the electrolyzing purification and sterilization of water with low electrical conductivity and a high COD load such as bathtubs, swimming pools and farming tanks.

In accordance with the present invention, the problem of the terminal bonding of the nickel ferrite, which has a high corrosion resistance, is less inexpensive than platinum plating, and is effective for low conductive water such as baths or swimming pools, can be resolved. It allows they're to be a sufficient contact area between the long terminal body and the ferrite electrode, and consequently the current from the terminal to the electrode is improved. A soft conductive metal with a low melting point or mercury improves electrical conductivity by bonding between the terminal and the electrode without any gap. The nickel ferrite electrode, which is ceramic, and the metal terminal have different thermal expansions, nonetheless, a metal with a low melting point or mercury can compensate for the gap with its fluid characteristics.

In the case of a metal with a low melting point, even if the gap is not filled at first, when the current decreases and the voltage increase it partially generates heat. Consequently the metal with a low melting point becomes fluid and fills the gap and prevents heat.

In addition, in accordance with the present invention, directly immersing one of the multiplicity of electrolyzing devices 2 in the water to be treated such as in the balance tank 22 causes electrolyzing in the barrel-shaped long electrolyzing device installed in a vertical manner and creates an air lifting effect, namely a raising of the violently generated gas at the inter-electrode reactive portion 9. Consequently, external water is sucked into the electrolyzing device from the water entrance 10 and electrolyzed at the inter-electrode reactive portion 9 and along with the generated gas, it is discharged from the electrolysis treated water exit 11 to the balance tank 22 after being purified and sterilized. Because the electrode is barrel-shaped (cylindrical-shaped) and fastened at only the top and bottom edge with electrode fastener 14, it allows an external electrode to come directly in contact with the water. Thus, even if the voltage increases and the electrodes are heated, it is easily cooled, thereby preventing breakage or deformation of the ferrite electrodes or electrode fastener 14, which is made of synthetic resin.

In addition, because the electrodes directly come in contact with the water, in order to protect the electrolyzing device, it is immersed in the water after storing it in a mesh or a conductive protective case with holes 17. This case has a ground so that a failure of the other sensors or other control systems due to stray current generated from the electrodes can be eliminated.

In accordance with the present invention, when the water of the subject has a low electrical conductivity, electrolysis can be conducted by adding a solution of bromine ions, chlorine ions or a mixture of bromine ions and chlorine ions as a halogen ion, while the designated electric conductivity is maintained. Therefore, electrolysis can be conducted stably even with water with a low electrical conductivity of 400 to 900 $\mu$S/cm, such as a swimming pool, bathtub, pond, 24-hour bath, farming tank, AC water, waste water from washing, or combined treatment water (secondary purification process when the water is recycled as treated water). In addition, the pH of these waters is normally approximately 6.5 to 7.5. However the pH, in which a hypochlorinous acid with a high oxidation and sterilization effect can be generated, is 4 to 6. In order to improve this condition, by adding sodium bromide, the concentration of the hypohalogenous acid that is effective even under a pH of 6.5 to 7.5 can be brought to 90% or more. As a result, sterilization of legionella bacteria that has become a significant problem in 24-hour baths can be easily carried out.

In addition, in accordance with the present invention, it is compact and doesn't require a large space, so that it can be installed in a narrow space in a simple manner and it does not require plumbing work. A sophisticated purification/sterilization system can be provided such that it can be directly immersed in the water tanks 20, etc., such as a swimming pool, bathtub, farming tank, AC water, waste water from washing, or combined treatment water (secondary purification process when the water is recycled as treated water) or it can use the existing facility such as balance tank 22 of the water circulation line 29. Consequently it is effective for businesses that seek a reduction in costs.

Furthermore, in accordance with the present invention, not only does it purify and sterilize the circulating water but also by using the purification/sterilization power of the hypohalogenous acid generated in the water by the electrolysis, organic materials that cause clogging of the filter can be oxidized and removed. In addition, microbes that hinder the hollow fiber membrane by propagating on the dirty filter can be sterilized and removed. As a result, of the inorganic and organic coagulation that adheres to the filtration such as sand and creates a filtration resistance, the organic material is oxidized and decomposed, and therefore, the remaining coagulation, which is primarily inorganic, can be easily removed from the filtration, allowing the reverse flow washing to be more effective. In accordance with the present invention, even if the hard components existing in the water are electrolyzed and turned into metal hydroxides, etc., and deposited on the cathode, immersing it in a 0.2 to 5% solution of inorganic acid such as hydrochloric acid or phosphoric acid for around 15 minutes allows it to be completely dissolved and removed. When water that does not allow the use of inorganic acid is purified and sterilized, a solution of an organic acid such as acetic acid that is adjusted to be a pH of 0.5 to 3 can easily remove the deposition of metal hydroxides on the cathode. Therefore the surface of the electrode can be always kept clean.

In accordance with the present invention, the compact water treatment tank 37 is an electrolyzing tank installed midway in the water circulation line 29. The inside of the case itself can become a cleaning device for an electrode with metal hydroxides deposited on the cathode. Compared to the regular method in which the electrode is taken out and cleaned, a very quick and simple maintenance can be carried out. In addition, by the air lifting effect of the electrolyzing device 1 of the present invention, the mixing and circulation is carried out both in and outside of the electrolyzing device and consequently it does not require a special means such as an agitator.

The disclosure of Japanese Patent Application No. 2000-328779 filed Oct. 27, 2000 including specification, drawings and claims is incorporated herein by reference in its entirety.

Although only some exemplary embodiments of this invention have been described in detail above, those skilled in the art will readily appreciated that many modifications are possible in the exemplary embodiments without materially departing from the novel teachings and advantages of this invention. Accordingly, all such modifications are intended to be included within the scope of this invention.

What is claimed is:

1. A water purification/sterilization method comprising steps of:

preparing an electrolyzing device having an anode comprising one of a ferrite pipe, ferrite rod, conductive metal pipe and conductive metal rod, each of said conductive pipe and rod has a surface coated with a ferrite film, and a cathode comprising a conductive metal pipe, the anode and the cathode are alternately arranged in a concentric manner with an inter-electrode interval of 1.1 to 9 mm;

storing the electrolyzing device in a conductive case with a plurality of holes, connecting the conductive case to ground;

immersing the electrolyzing device in the case into water in a first tank, wherein said water contains electrolyte; and flowing the water between the anode and cathode; and electrolyzing the water.

2. The water purification/sterilization method in accordance with claim 1 wherein, the anode has a first hole in an elongated direction enclosing one of a ferrite rod and a ferrite pipe having a second hole, further wherein one of a conductive low-melting point metal and mercury is filled between the anode and the ferrite rod or pipe, further wherein the second hole encloses a conductive terminal body.

3. The water purification/sterilization method in accordance with claim 1 wherein, said water is foul water.

4. The water purification/sterilization method in accordance with claim 3 wherein, said method further comprises the steps of:

supplying the foul water that contains a halogen ion between the anode and cathode; and carrying out electrolysis while the foul water is kept at a predetermined electrical conductivity to purify and sterilize the foul water.

5. The water purification/sterilization method in accordance with claim 4 wherein, said halogen ion is at least one of bromine ion, chlorine ion and a mixture of bromine ion and chlorine ion.

6. The water purification/sterilization method in accordance with claim 3 wherein, said method comprises steps of:

installing a power/operation control device outside said tank that supplies power to and controls said electrolyzing device; and installing an electrolyte solution supply tank that supplies the electrolyte to the first tank.

7. The water purification/sterilization method in accordance with claim 3 wherein, said method comprises steps of:

providing a water circulation line that circulates water in the first tank and a filter that filters said water, installing the electrolyzing device upstream from said filter so that the water purified by an electrolytic treatment containing hypohalogenous acid which is created by electrolysis, penetrates said filter and circulates.

8. The water purification/sterilization method in accordance with claim 7, said method further comprises steps of:

providing a back wash switching valve and a back wash line; and switching said back wash switching valve to reverse flow the water containing hypohalogenous acid created by the electrolyzer, through the back wash line and to wash said filter.

9. The water purification/sterilization method in accordance with claim 3, the method further comprises steps of:

immersing the electrolyzing device into a solution of an inorganic or organic acid and removing attached deposition of metal hydroxides on the cathode.

10. The water purification/sterilization method in accordance with claim 3, wherein said first tank is one of a swimming pool, bathtub, farming tank and air conditioning system.

11. A water purification/sterilization method in accordance with claim 3, wherein said first tank is a balance tank and the water is introduced via a water circulation line from one of a swimming pool, bathtub, farming tank or air conditioning system.

12. A water purification/sterilization device comprising:

an electrolyzing device stored in a grounded conductive case;

a water treatment tank that is installed midway in a water circulation line, wherein said electrolyzing device is immersed in the water treatment tank;

an acid solution tank that supplies an acid solution to said water treatment tank;

a power source and control device that controls the operation of electrolyzing device; and a supply of inorganic or organic acid.

13. The water purification/sterilization device according to claim 12, the acid solution is one selected from an inorganic acid including hydrochloric acid or phosphoric acid and an organic acid including acetic acid.

14. The water purification/sterilization device in accordance with claim 12, wherein the grounded conductive case is a plastic or wooden case with conductive material.

15. The water purification/sterilization device in accordance with claim 12, wherein the grounded conductive case is in a lattice shape or a mesh.

16. The water purification/sterilization device in accordance with claim 12, wherein the grounded conductive case has a plurality of holes.

17. A water purification/sterilization device comprising:

an electrolyzing device having an anode which is selected from the group of a ferrite pipe, a ferrite rod, a conductive metal pipe having a ferrite film and a conductive metal rod having a ferrite film, a conductive metal pipe cathode, wherein the anode and the cathode are alternately arranged in a concentric manner with inter-electrode intervals of 1.1 to 9 mm, and water containing electrolyte flows between the anode and the cathode to electrolyze the water; and a grounded conductive case in which the electrolyzing device is stored.

18. A water purification/sterilization device in accordance with claim 17, wherein said anode is one of a ferrite rod with a first long hole along a center axis direction of the rod and a ferrite pipe; a conductive rod terminal body that is inserted in said first long hole or pipe; a conductive low-melting point metal bonding portion or mercury that is inserted in between said long hole or pipe and said terminal body.

19. The water purification/sterilization device in accordance with claim 18, the device further comprises a water circulation line that circulates water in said tank; a filter that filters said water, and said electrolyzing device is installed upstream from said filter so that the water purified by an electrolytic treatment containing hypohalogenous acid which is created by electrolysis, penetrates said filter and circulates.

20. The water purification/sterilization device in accordance with claim 17, the electrolyzing device is stored in a protective case with a plurality of holes and installed in a tank.

21. The water purification/sterilization device in accordance with claim 20 wherein, the device further comprises a power and operation controller that supplies electric power to and controls said electrolyzing device, with an electrolyte solution supply tank that supplies the electrolyte to said tank.

22. The water purification/sterilization device according to claim 21, the device further comprises a back wash switching valve and a back wash line, and by switching said back wash switching valve, water containing hypohalogenous acid, created by electrolyzing, back washes through the back wash line and washes said filter.

23. A water purification/sterilization device wherein, said tank in claim 20 is selected from a group of a swimming pool, bathtub, farming tank, AC system or balance tank.

24. A water purification/sterilization device wherein, said tank in claim 20 is a balance tank which is selected from a group of a swimming pool, bathtub, farming tank and air conditioning system is introduced via a water circulation line.

25. The water purification/sterilization device in accordance with claim 17, the water supplied in between said electrolyzing device, the water contains halogen ion and is purified and sterilized.

26. The water purification/sterilization device in accordance with claim 25 wherein said halogen ion is selected from a group of bromine ion, chlorine ion, and a mixture of bromine ion and chlorine ion.

27. The water purification/sterilization device in accordance with claim 17, wherein the grounded conductive case is a plastic or wooden case with conductive material.

28. The water purification/sterilization device in accordance with claim 17, wherein the grounded conductive case is in a lattice shape or a mesh.

29. The water purification/sterilization device in accordance with claim 17, wherein the grounded conductive case has a plurality of holes.

30. A water purification/sterilization method comprising steps of:

preparing an electrolyzing device having an anode comprising one of a ferrite pipe, ferrite rod, conductive metal pipe and conductive metal rod, each of said conductive pipe and rod has a surface coated with a ferrite film, and a cathode comprising a conductive metal pipe, the anode and the cathode are alternately arranged in a concentric manner with an inter-electrode interval of 1.1 to 9 mm;

storing the electrolyzing device in a case with a plurality of holes, immersing the electrolyzing device in the case into foul water in a first tank, wherein said water contains electrolyte;

flowing the foul water between the anode and cathode;

electrolyzing the foul water;

providing a water circulation line that circulates the foul water in the first tank, and a filter that filters said foul water, and installing the electrolyzing device upstream from said filter so that the foul water purified by an electrolytic treatment containing hypohalogenous acid which is created by electrolysis, penetrates said filter and circulates.

31. The water purification/sterilization method in accordance with claim 30, said method further comprises steps of:

providing a back wash switching valve and a back wash line; and switching said back wash switching valve to reverse flow the water containing hypohalogenous acid created by the electrolyzer, through the back wash line and to wash said filter.

32. A water purification/sterilization method comprising steps of:

preparing an electrolyzing device having an anode comprising one of a ferrite pipe, ferrite rod, conductive metal pipe and conductive metal rod, each of said conductive pipe and rod has a surface coated with a ferrite film, and a cathode comprising a conductive metal pipe, the anode and the cathode are alternately arranged in a concentric manner with an inter-electrode interval of 1.1 to 9 mm;

storing the electrolyzing device in a case with a plurality of holes, immersing the electrolyzing device in the case into foul water in a first tank, wherein said water contains electrolyte;

flowing the foul water between the anode and cathode;

electrolyzing the foul water;

immersing the electrolyzing device into a solution of an inorganic or organic acid and removing attached deposition of metal hydroxides on the cathode.

33. A water purification/sterilization device comprising:

an electrolyzing device comprising an anode which is one of a ferrite rod with a first long hole along a center axis direction of the rod and a ferrite pipe; a conductive metal pipe cathode; the anode and the cathode are alternately arranged in a concentric manner with inter-electrode intervals of 1.1 to 9 mm, wherein water containing electrolyte flows between the anode and the cathode to electrolyze the water; a conductive rod terminal body being inserted in said first long hole or pipe; and a conductive low-melting point metal bonding portion or mercury being inserted in between said long hole or pipe and said terminal body, a water circulation line that circulates water in said tank; and a filter that filters said water, wherein said electrolyzing device is installed upstream from said filter so that the water purified by an electrolytic treatment containing hypohalogenous acid which is created by electrolysis, penetrates said filter and circulates.

34. A water purification/sterilization device comprising:

an electrolyzing device comprising an anode which is selected from the group of a ferrite pipe, a ferrite rod, a conductive metal pipe having a ferrite film and a conductive metal rod having a ferrite film, a conductive metal pipe cathode, the anode and the cathode are alternately arranged in a concentric manner with inter-electrode intervals of 1.1 to 9 mm, wherein water containing electrolyte flows between the anode and the cathode to electrolyze the water, and the electrolyzing device is stored in a protective case with a plurality of holes and installed in a tank;

a power and operation controller that supplies electric power to and controls said electrolyzing device, with an electrolyte solution supply tank that supplies the electrolyte to said tank; and a back wash switching valve and a back wash line, and by switching said back wash switching valve, water containing hypohalogenous acid, created by electrolyzing, back washes through the back wash line and washes said filter.

* * * * *